United States Patent
Russ (10) Patent No.: US 9,074,521 B2
(45) Date of Patent: Jul. 7, 2015

(54) TURBOCHARGER SYSTEM HAVING A SHARED BYPASS CONDUIT AND WASTEGATE

(75) Inventor: Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 580 days.

(21) Appl. No.: 13/426,524

(22) Filed: Mar. 21, 2012

(65) Prior Publication Data

US 2013/0247561 A1 Sep. 26, 2013

(51) Int. Cl.
| | |
|---|---|
| *F02B 33/44* | (2006.01) |
| *F02D 23/00* | (2006.01) |
| *F01N 5/04* | (2006.01) |
| *F02B 33/00* | (2006.01) |
| *F02B 37/00* | (2006.01) |
| *F02B 37/12* | (2006.01) |
| *F02B 37/007* | (2006.01) |
| *F02B 37/18* | (2006.01) |

(52) U.S. Cl.
CPC ............... *F02B 37/00* (2013.01); *F02B 37/12* (2013.01); *Y02T 10/144* (2013.01); *F02B 37/007* (2013.01); *F02B 37/18* (2013.01)

(58) Field of Classification Search
CPC ........ F02B 33/44; F02B 37/00; F02B 37/001; F02B 37/007; F02B 37/12; F02B 378/18; F02B 37/22; F02B 37/183; F02B 37/186; F02D 23/00; F02D 41/007; F02M 25/0711; F01D 178/105; F02F 1/4262; Y02T 10/144; Y02T 10/146; Y02T 10/40; F01N 13/04; F01N 13/107

USPC .............................. 60/612, 602, 280; 123/562
IPC ......................................................... F02B 37/00
See application file for complete search history.

(56) References Cited

U.S. PATENT DOCUMENTS

| | | | | |
|---|---|---|---|---|
| 4,538,574 | A | * | 9/1985 | Lombardi ...................... 60/612 |
| 5,003,781 | A | * | 4/1991 | Shibata et al. .................. 60/612 |
| 5,046,317 | A | | 9/1991 | Satokawa |

(Continued)

FOREIGN PATENT DOCUMENTS

| | | | | |
|---|---|---|---|---|
| DE | 3629841 | A1 * | 5/1987 | ............. F02B 37/00 |
| EP | 2246543 | A1 * | 11/2010 | ............. F02B 37/18 |

(Continued)

OTHER PUBLICATIONS

"RomRaider Def Req—MY03 Legacy 2.0 B4 Twin Turbo AH650-4430 ADM Auto," http://www.romraider.com/forum/viewtopic.php?f=8&t=984&start=45, pp. 1-4, Accessed Sep. 7, 2011.

(Continued)

*Primary Examiner* — Thai Ba Trieu
(74) *Attorney, Agent, or Firm* — Julia Voutyras; Alleman Hall McCoy Russell & Tuttle LLP (57) ABSTRACT

A turbocharger system is provided. The turbocharger system may include a first turbocharger including a first turbine in fluidic communication with a first cylinder, a second turbocharger including a second turbine in fluidic communication with a second cylinder, and a shared bypass conduit having a wastegate coupled thereto, the shared bypass conduit is in fluidic communication with an inlet of the first turbine and an inlet of the second turbine.

15 Claims, 5 Drawing Sheets

(56) References Cited

U.S. PATENT DOCUMENTS

| | | | |
|---|---|---|---|
| 5,140,817 A * | 8/1992 | Matsuda et al. | 60/612 |
| 5,197,287 A * | 3/1993 | Okimoto et al. | 60/612 |
| 5,201,790 A * | 4/1993 | Mukai et al. | 60/612 |
| 5,943,864 A | 8/1999 | Sumser et al. | |
| 6,766,645 B2 * | 7/2004 | Zimmer et al. | 60/612 |
| 6,941,755 B2 | 9/2005 | Bucknell et al. | |
| 6,973,787 B2 * | 12/2005 | Klingel | 60/612 |
| 7,051,527 B2 * | 5/2006 | Schmid et al. | 60/602 |
| 7,509,805 B2 * | 3/2009 | Karlsson | 60/612 |
| 7,975,478 B2 * | 7/2011 | Zielke et al. | 60/612 |
| 8,297,053 B2 * | 10/2012 | Gladden et al. | 60/612 |
| 2010/0083656 A1 * | 4/2010 | Parlow et al. | 60/612 |
| 2011/0126812 A1 | 6/2011 | Miyashita | |
| 2011/0146634 A1 * | 6/2011 | Iwatani et al. | 123/562 |
| 2011/0289919 A1 * | 12/2011 | Oyagi et al. | 60/612 |
| 2012/0240572 A1 * | 9/2012 | Schorn et al. | 60/612 |
| 2012/0285164 A1 * | 11/2012 | Kuhlbach et al. | 60/612 |

FOREIGN PATENT DOCUMENTS

| | | | | |
|---|---|---|---|---|
| JP | 02119627 A * | 5/1990 | | F02B 37/00 |
| JP | 03229921 A * | 10/1991 | | F02B 37/00 |
| JP | 07293262 A * | 11/1995 | | F02B 37/00 |
| JP | 2008121635 A * | 5/2008 | | F02B 37/00 |
| WO | 0109495 A1 | 2/2001 | | |

OTHER PUBLICATIONS

"2005 Ford Focus Engine Bay Photo 1," http://www.superstreetonline.com/featuredvehicles/130_0610_2005_ford_focus_twin_turbo/photo_01.html, pp. 1-2, Accessed Sep. 7, 2001.

* cited by examiner

TURBOCHARGER SYSTEM HAVING A SHARED BYPASS CONDUIT AND WASTEGATE

BACKGROUND/SUMMARY

Turbochargers have been developed to increase the power output to weight ratio of engines. Thus, the power output of an engine may be increased without a substantial increase in an engine's weight or an engine's size (e.g., displacement). Alternatively, engine displacement may be decreased while the engine provides an equivalent amount of output power as a larger non-boosted engine.

However, turbochargers may experience turbo-lag. Turbo-lag may be defined as the time needed to change the speed of the turbocharger to produce a desired amount of boost in response to a change in engine torque demand. Turbo-lag may provide less than desirable engine performance.

Twin-turbocharger systems have been developed to reduce turbo-lag. Specifically, a turbocharger is provided for each of two cylinder banks. Efficiency of each of the two turbochargers may be adjusted via wastegates. Each wastegate regulates flow through a passage that begins upstream of one of the turbocharger turbines and returns exhaust gas to a location downstream of the same turbocharger turbine in an exhaust passage that directs exhaust away from only the cylinder bank sending exhaust to the turbocharger turbine. Thus, each bypass passage bypasses one of the turbines and not the other turbine.

However, the Inventors have recognized several drawbacks with utilizing a wastegate for each turbine in an engine having a parallel turbocharger configuration. For example, it may be costly to employ two wastegates in an engine. Furthermore, the profile of the exhaust system may be increased when two separate wastegates are utilized. Also, it may be desirable to have balanced exhaust flow traveling through each of the turbines and/or bypass conduits in a parallel turbine arrangement. However, due to manufacturing, control, and design differences between the two turbines, the wastegates may not provide an equivalent exhaust gas bypass around each of the turbines. Such conditions may lead to unbalanced exhaust flow and torque differences between cylinder banks. As a result, the turbocharger operation may be degraded.

As such, in one approach a turbocharger system is provided that may improve flow equalization between cylinder banks. The turbocharger system includes a first turbocharger including a first turbine in fluidic communication with a first cylinder, a second turbocharger including a second turbine in fluidic communication with a second cylinder, and a shared bypass conduit having a sole wastegate coupled thereto, the shared bypass conduit in fluidic communication with a first turbine inlet and a second turbine inlet. In this way, a single bypass conduit and wastegate may be used to bypass two turbines. As a result, the possibility of imbalanced bypass operation may be reduced. Moreover, the cost as well as size of the turbocharger system may be reduced when compared to turbocharger systems employing two wastegates and bypass conduits.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A vehicle having twin turbocharger system is described herein. The turbocharger system may include a first turbine in fluidic communication with a first cylinder bank and a second turbine in fluidic communication with a second cylinder bank. Each of the cylinder banks may include at least one cylinder. A shared turbine bypass conduit having a sole wastegate position therein may be in fluidic communication with exhaust conduits upstream and downstream of each of the turbines. Thus, the speed of the turbines may be controlled via a single wastegate preventing imbalanced bypass operation.

Further in some examples, the vehicle may further include a controller configured to adjust the position of the wastegate. The following control strategy may be employed via the controller. During a first operating condition, the wastegate may be controlled via the controller to substantially inhibit exhaust gas flow therethrough and during a second operating condition the wastegate may be controlled via the controller to enable exhaust to flow therethrough. The second operating condition may be when the flowrate of the exhaust gas exiting one of the cylinder banks exceeds a predetermined threshold value and the first operating condition may be when the flowrate of the exhaust gas exiting both of the cylinders banks is below the predetermined threshold value. In this way, the wastegate may be controlled based on the operating conditions in both of the exhaust streams exiting the engine to reduce the likelihood of the turbines exceeding a threshold speed. As a result, the likelihood of turbine damage from elevated turbine speeds is reduced.

Figure 1:
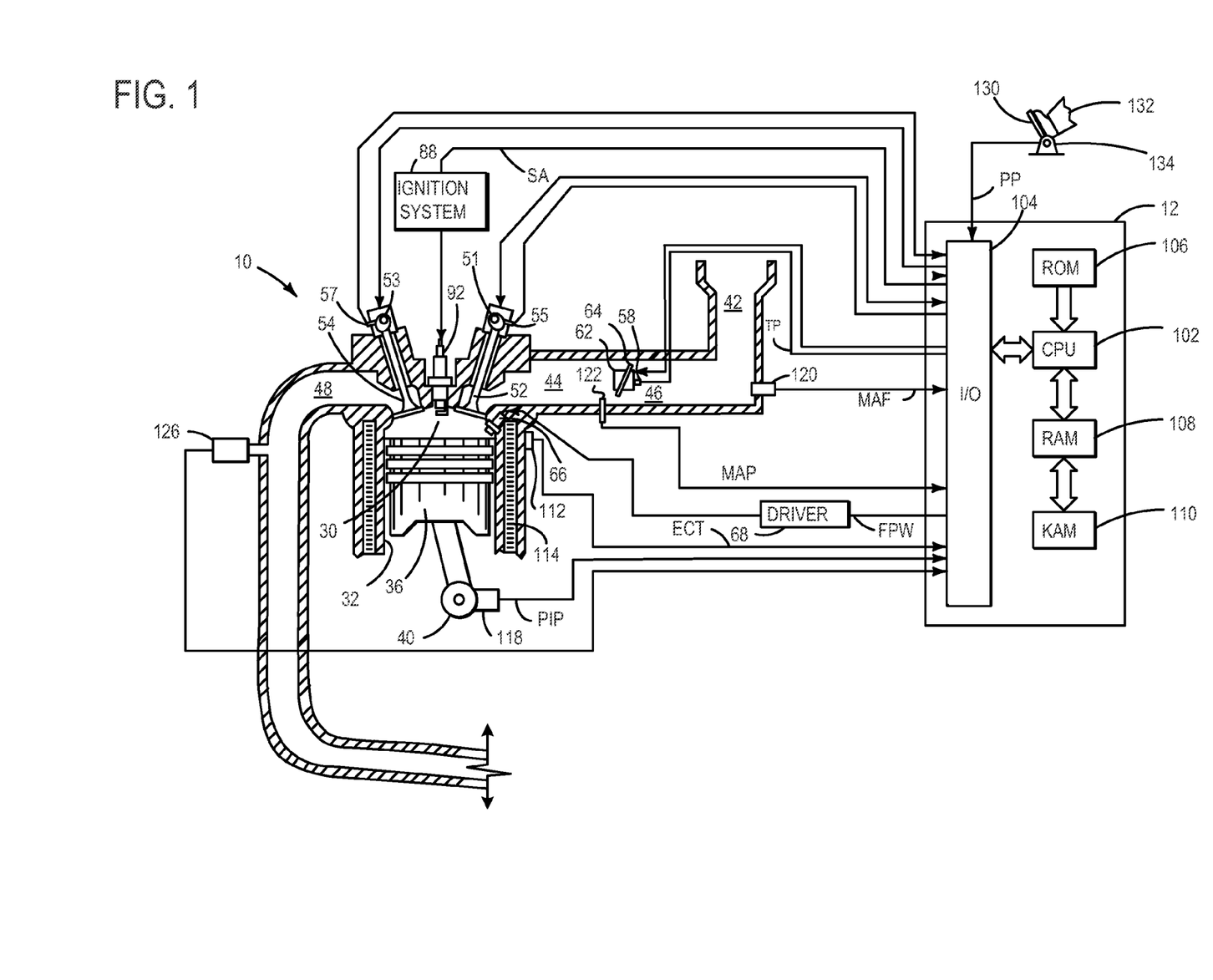
FIG. 1 shows a schematic depiction of an engine.
Figure 2:
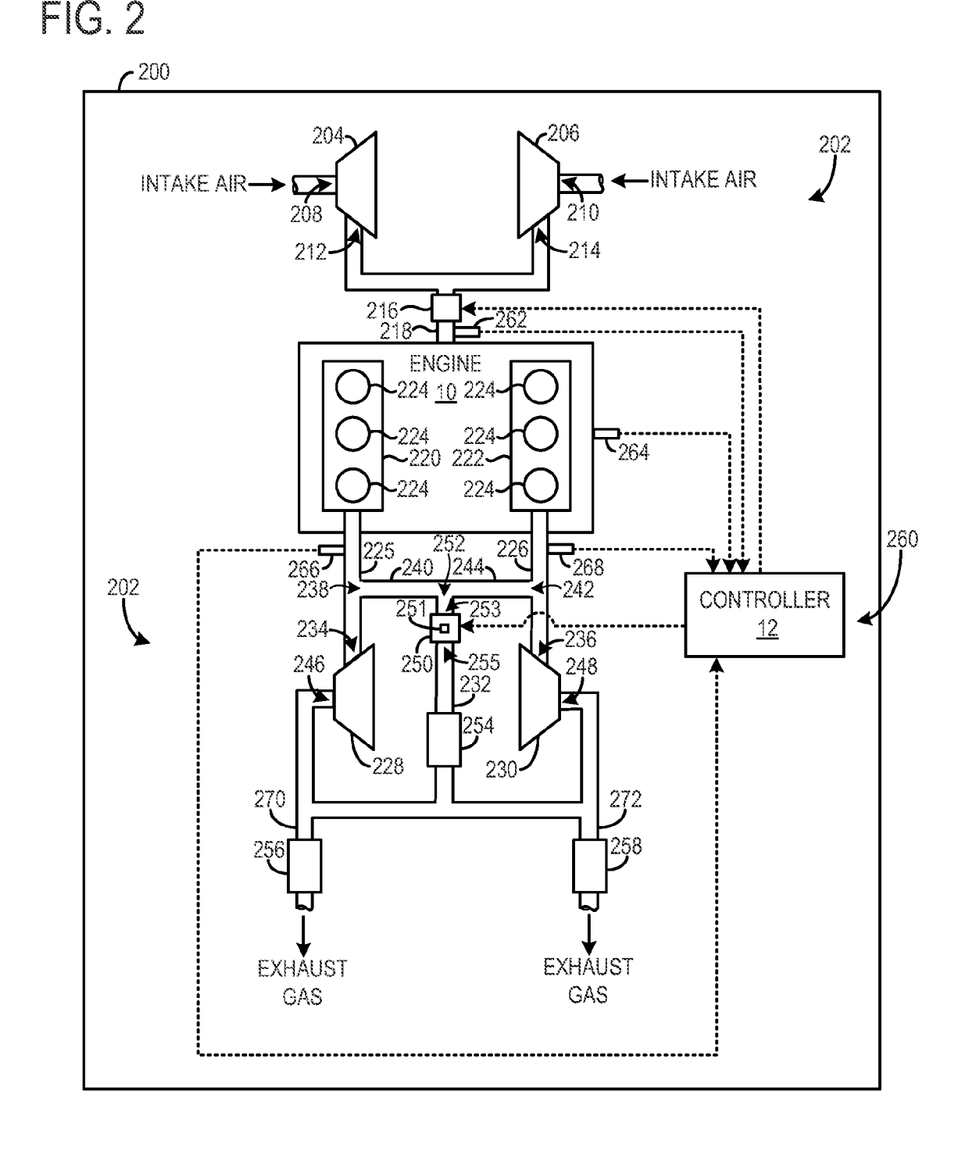
FIG. 2 shows a schematic depiction of a vehicle including the engine shown in FIG. 1 and a turbocharger system.
Figure 3:
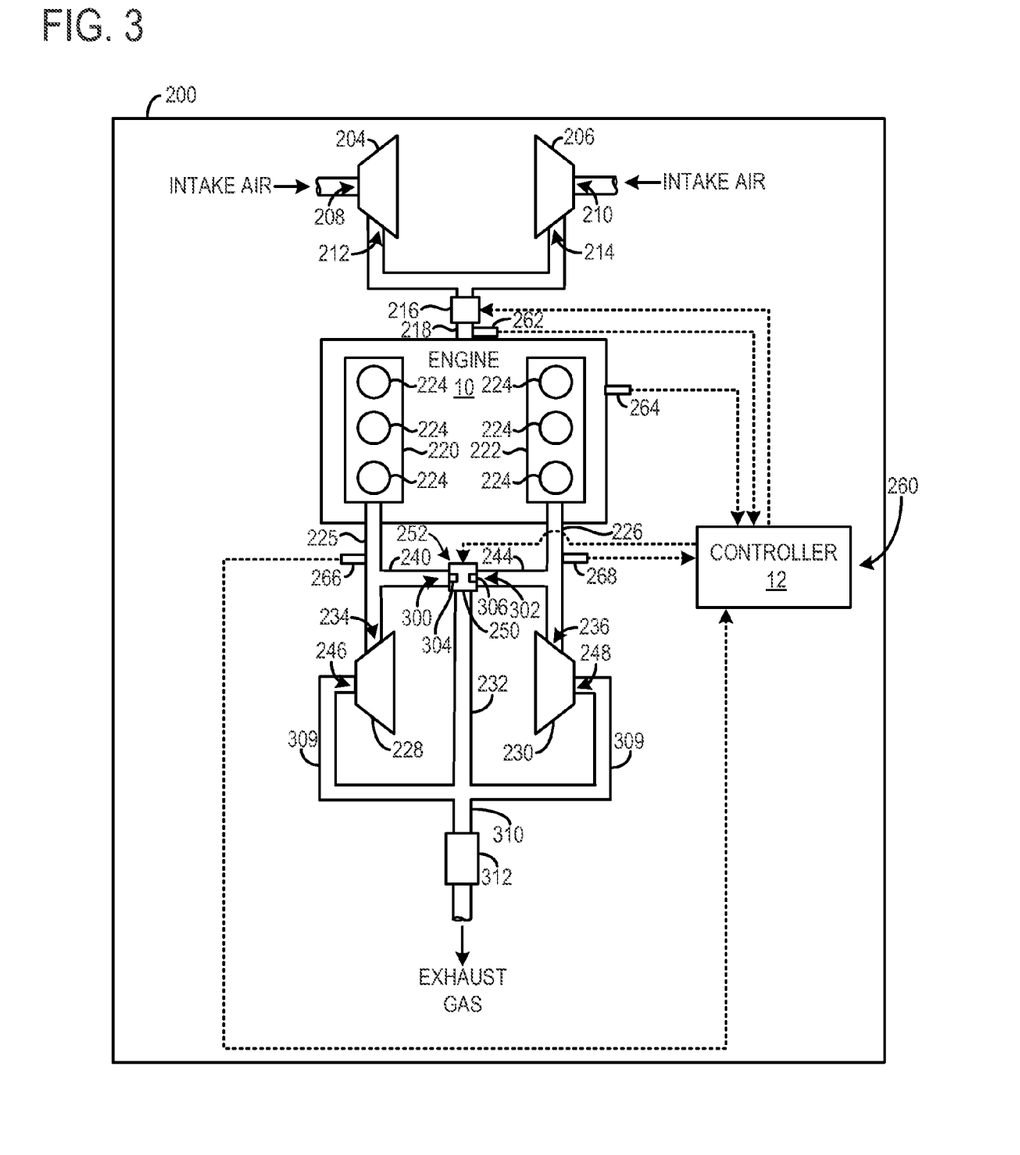
FIG. 3 shows another example of the turbocharger system included in the vehicle shown in FIG. 2.
Figure 4:
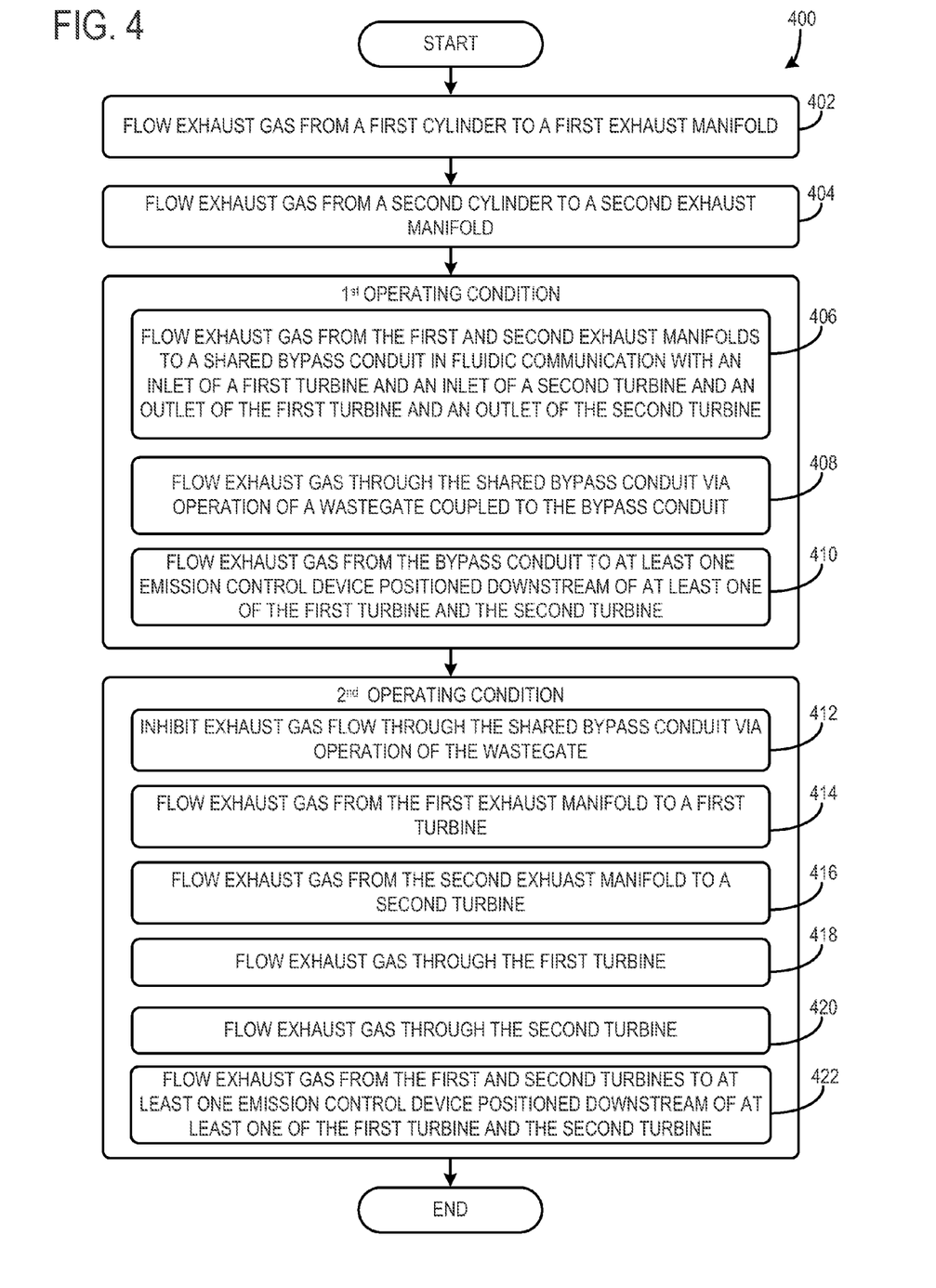
FIG. 4 shows a method for operation of a turbocharger system.
Figure 5:
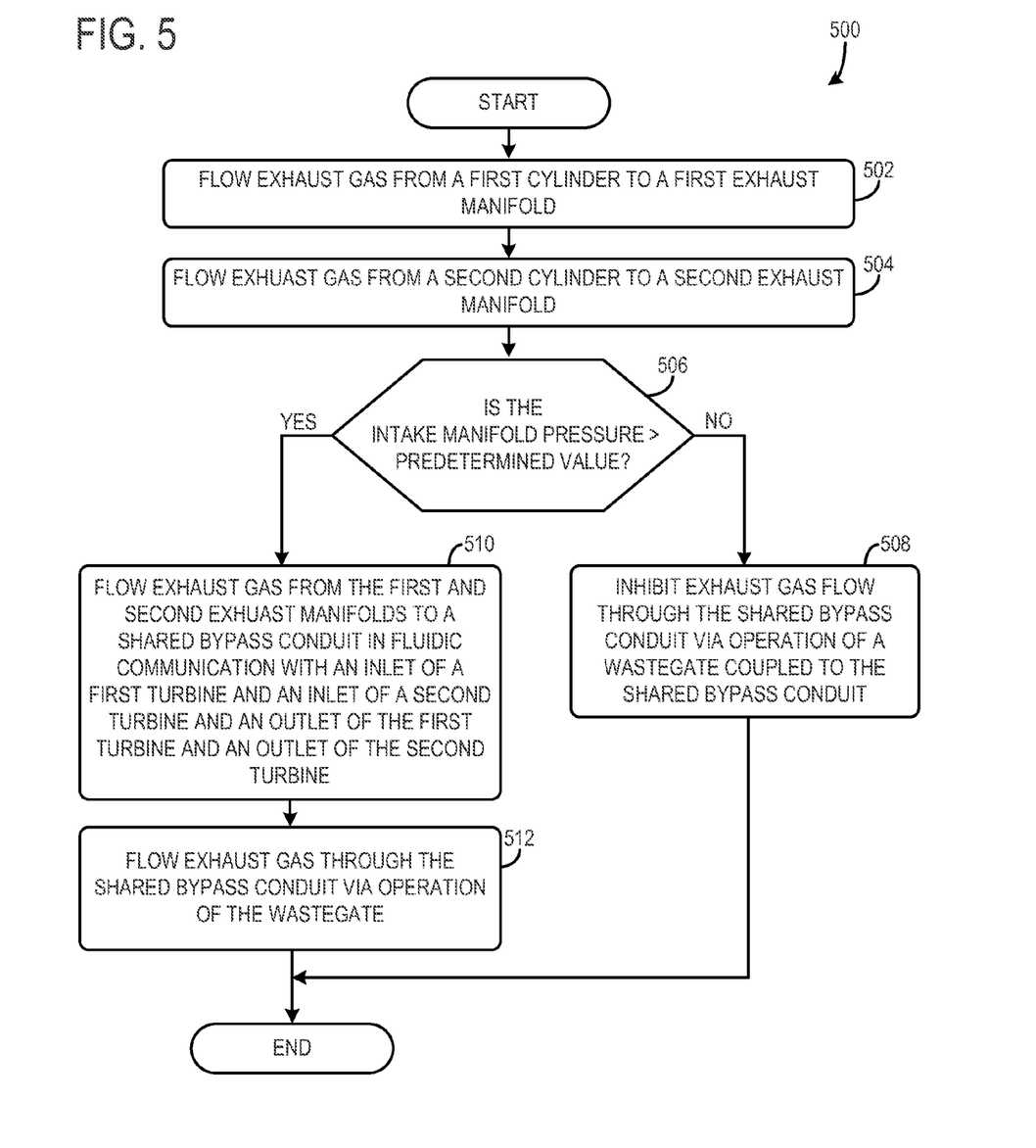
FIG. 5 shows another method for operation of a turbocharger system.

FIG. 1 shows a schematic depiction of an engine. FIG. 2 shows a schematic depiction of a vehicle including a turbocharger system. FIG. 3 shows another example of the turbocharger system. FIGS. 4 and 5 show methods for operation of a turbocharger system.

Referring to FIG. 1, internal combustion engine 10, comprising a plurality of cylinders, one cylinder of which is shown in FIG. 1, is controlled by electronic engine controller 12. Engine 10 includes cylinder 30 and cylinder walls 32 with piston 36 positioned therein and connected to a crankshaft 40. Cylinder 30 is shown communicating with intake manifold 44 and exhaust manifold 48 via respective intake valve 52 and exhaust valve 54.

A first compressor 204 and a second compressor 206, shown in FIG. 2, may positioned upstream of the intake manifold 44 and the intake passage 42. Likewise, a first turbine 228 may be positioned downstream of the exhaust manifold 48.

It will be appreciated that although a single cylinder is shown in FIG. 1, the engine 10 may include a plurality of cylinders. The plurality of cylinders may be arranged in engine banks as discussed in greater detail herein with regard to FIG. 2. Moreover, the engine 10 may include a second exhaust manifold in fluidic communication with one or more cylinders. The second exhaust manifold 226, shown in FIG. 2, may be in fluidic communication with a second turbine 230, shown in FIG. 2, discussed in greater detail herein.

Each intake and exhaust valve may be operated by an intake cam 51 and an exhaust cam 53. Alternatively or additionally, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. In some examples, throttle 62 may be configured to adjust the amount of air flow provided to a second cylinder and/or cylinder bank. A high pressure, dual stage, fuel system may be used to generate higher fuel pressures at injectors 66.

Distributorless ignition system 88 provides an ignition spark to cylinder 30 via spark plug 92 in response to controller 12. Universal Exhaust Gas Oxygen (UEGO) sensor 126 is shown coupled to exhaust manifold 48. Alternatively, a two-state exhaust gas oxygen sensor may be substituted for UEGO sensor 126.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

FIG. 2 shows a vehicle 200 including the engine 10. The vehicle 200 further includes a turbocharger system 202. The turbocharger system 202 includes a first compressor 204 and a second compressor 206. The first compressor 204 and the second compressor 206 may be substantially identical. That is to say, they each may contain the same components which have equivalent sizes. In this way, the first and second compressors (204 and 206) in the turbocharger system 202 may be balanced. However, other compressor configurations have been contemplated.

The first and second compressors (204 and 206) are configured to provide boost to the engine. Thus, intake air having higher density than ambient air is provided to the engine 10 which may enable engine performance to be increased either via an increase in combustion power and/or combustion efficiency.

The first compressor 204 may include a compressor inlet 208. Likewise, the second compressor 206 may also include a compressor inlet 210. The compressor inlets (208 and 210) may receive intake air from an upstream conduit in fluidic communication with the surrounding atmosphere. Further in some examples, a single throttle may be positioned upstream of the first and second compressors (204 and 206) or a throttle may be positioned upstream of each of the first compressor 204 and the second compressor 206.

The first compressor 204 includes a compressor outlet 212. Likewise, the second compressor includes a compressor outlet 214. The compressor outlets (212 and 214) may be in fluidic communication with a throttle 216. The throttle 216 may be configured to adjust the amount of intake air provided to engine 10. The throttle 216 is positioned in an intake conduit 218. The intake conduit 218 is in fluidic communication with the compressor outlet 212 of the first compressor 204 and the compressor outlet 214 of the second compressor 206. An intercooler (not shown) may also be positioned downstream of the first compressor and the second compressor 206. In this way, the intake air may be cooled to increase the density of the intake air, to improve engine performance.

The engine 10 includes a first cylinder bank 220 and a second cylinder bank 222. Each of the cylinder banks are depicted as including a plurality of cylinders 224. It will be appreciated that cylinder 30 shown in FIG. 1 is included in the plurality of cylinders 224. However, it will be appreciated that in other examples the first cylinder bank 220 and/or second cylinder bank 222 may each include only a single cylinder. Furthermore, the cylinder banks (220 and 222) each have an equivalent number of cylinders. However, other cylinder configurations have been contemplated. For example, the cylinders may not be divided into cylinder banks.

The intake conduit 218 is in fluidic communication with the first and second cylinder banks (220 and 222). Specifically, an intake manifold may supply intake air to the first cylinder bank 220 as well as the second cylinder bank 222. In other examples, two throttles may be provided in the intake system and therefore the first compressor 204 may be in fluidic communication with the first cylinder bank 220 and the second compressor 206 may be in fluidic communication with the second cylinder bank 222.

A first exhaust manifold 225 is in fluidic communication with each of the cylinders in the first cylinder bank 220. The first exhaust manifold 225 may be in fluidic communication with the exhaust manifold 48, shown in FIG. 1. A second exhaust manifold 226 is in fluidic communication with each of the cylinders in the second cylinder bank 222. Additionally, the first exhaust manifold 225 is in fluidic communication with a turbine inlet 234 of a first turbine 228. Likewise, the second exhaust manifold 226 is in fluidic communication with a turbine inlet 236 of the second turbine 230. The first turbine 228 and the second turbine 230 may be substantially identical. That is to say, they each may contain the same components which have equivalent sizes. In this way, the turbocharger system may be balanced. However, other turbine configurations have been contemplated.

The first turbine 228 and the second turbine 230 are included in the turbocharger system 202 and are configured to transfer a rotational output to the first compressor 204 and the second compressor 206, respectively. Specifically, the first turbine 228 and the first compressor 204 are included in a first turbocharger and the second turbine 230 and the second compressor 206 are included in a second turbocharger. It will be appreciated that the first turbine 228 is rotatably coupled to the first compressor 204. Likewise, the second turbine 230 is rotatably coupled to the second compressor 206.

The turbocharger system 202 further includes a shared bypass conduit 232. The shared bypass conduit 232 is in fluidic communication with a turbine inlet 234 of the first turbine 228 and a turbine inlet 236 of the second turbine 230. Thus, the shared bypass conduit 232 includes a first inlet 238 included in a first branch passage 240 opening into the first exhaust manifold 225 and a second inlet 242 included in a second branch passage 244 opening into the second exhaust manifold 226. In this way, the exhaust gas from both the first and second intake manifolds (225 and 226) may be directed into a single shared bypass conduit 232.

The shared bypass conduit 232 is also in fluidic communication with a turbine outlet 246 of the first turbine 228 as well as a turbine outlet 248 of the second turbine 230. Specifically, in the depicted example the shared bypass conduit 232 is in fluidic communication with an exhaust conduit 270 positioned downstream of the turbine outlet 246 and an exhaust conduit 272 positioned downstream of the turbine outlet 248. However, other exhaust conduit arrangements have been contemplated.

A sole wastegate 250 is coupled to the shared bypass conduit 232. The wastegate 250 shown in FIG. 2 is positioned downstream of a confluence region 252 of the branch passages (240 and 244) of the shared bypass conduit 232. However, other wastegate positions may be used in other examples. For example, as shown in FIG. 3, the wastegate 250 may be positioned at the confluence region of the branch passages (240 and 244).

The wastegate 250 includes a wastegate inlet 253 and a wastegate outlet 255. The wastegate 250 may be configured to adjust the exhaust gas flow through the shared bypass conduit 232. Specifically, the wastegate 250 includes an adjustment mechanism 251 (e.g., a vacuum control valve or electric actuator) for implementing the aforementioned functionality. In some examples, the adjustment mechanism 251 (e.g., wastegate actuator) may be remotely mounted. As a result, engine packaging in the vehicle may be improved. In particular, the adjustment mechanism 251 may be positioned in a low temperature location in the vehicle to increase the longevity of the adjustment mechanism as well as potentially decrease the manufacturing cost of the adjustment mechanism due to decreased temperature tolerance constraints of the adjustment mechanism. For example, the adjustment mechanism 251 may be spaced away from the wastegate 250, spaced away from the exhaust manifolds (225 and 226), and/or spaced away from the turbines (228 and 230).

A first catalytic converter 254 may also be coupled to the shared bypass conduit 232 downstream of the wastegate 250. The first catalytic converter 254 may be configured to increase the temperature of the exhaust gas flowing therethrough, among other things. The first catalytic converter 254 can include multiple catalyst bricks, in one example. In another example, multiple emission control devices, each with multiple bricks, can be used. The first catalytic converter 254 can be a three-way type catalyst in one example.

A second catalytic converter 256 may be positioned in the exhaust conduit 270 downstream of the first turbine 228. Likewise, a third catalytic converter 258 may be positioned in the exhaust conduit 272 downstream of the second turbine 230. It will be appreciated that other emission control devices may be positioned downstream of the first turbine and/or the second turbine 230, such as filters.

The vehicle 200 may include a control system 260 including controller 12, the wastegate 250, and the throttle 216. Specifically, the wastegate 250 may be electronically coupled to the controller 12. Therefore, the controller 12 may adjust the position of the wastegate 250 via electronic signals. The throttle 216 may also be electronically coupled to the controller 12. Therefore, the controller 12 may adjust the position of the throttle 216 via electronic signals.

The vehicle 200 may also include a number of sensors in electronic communication with the controller 12. The sensors may include a pressure sensor 262 positioned in the intake conduit 218, a temperature sensor 264 coupled to the engine 10, a pressure sensor 266 coupled to the first exhaust manifold 225, and a pressure sensor 268 coupled to the second exhaust manifold 226. The vehicle 200 may further include oxygen sensors as well as additional temperature and pressure sensors as shown in FIG. 1. In some examples, the aforementioned sensors may be included in the control system 260.

The control system 260 may include executable instructions stored in non-transitory memory to adjust the wastegate 250 to flow exhaust gas through the shared bypass conduit 232 during a first operating condition and adjust the wastegate to substantially inhibit exhaust gas from through the shared bypass conduit during a second operating condition. The first operating condition may be when the flowrate of the exhaust gas exiting one of the first and second cylinder banks (220 and 222) or a pressure exceeds a predetermined threshold value and the second operating condition may be when the flowrate or pressure of the exhaust gas exiting both of the first and second cylinder banks is below a predetermined threshold value. It will be appreciated that the pressure in the first and second exhaust manifold (225 and 226) may be correlated to exhaust gas flowrate. The temperature of the exhaust gas may also be used to determined exhaust gas flowrate.

FIG. 3 shows another example of the vehicle 200 shown in FIG. 2. The vehicle 200 shown in FIG. 3 includes many of the same systems, components, etc., shown in FIG. 2. Therefore, similar parts are labeled accordingly.

As shown, the wastegate 250 is positioned at the confluence region 252 of the branch passages (240 and 244). Therefore, the wastegate 250, shown in FIG. 3, includes a first wastegate inlet 300 and a second wastegate inlet 302. The wastegate 250 may include a first adjustment mechanism 304 and a second adjustment mechanism 306. The first adjustment mechanism 304 may be configured to adjust the amount of exhaust gas received by the wastegate 250 from the first cylinder bank 220. Likewise, the second adjustment mechanism 306 may be configured to adjust the amount of exhaust gas received by the wastegate 250 from the second cylinder bank 222. In this way, the exhaust streams entering the wastegate 250 may be separately controlled. As a result, the exhaust gas flow from the first and second cylinder banks (220 and 222) may be balanced via control of the first adjustment mechanism 304 and the second adjustment mechanism 306.

Furthermore, the exhaust conduits 309 and the shared bypass conduit 232 fluidly converge into a single exhaust conduit 310 having an emission control device 312 coupled thereto. The emission control device 312 may be a catalytic converter, filter, etc. In some examples, an additional catalytic converter may be provided in bypass conduit 232.

FIG. 4 shows a method 400 for operating a turbocharger system. The method 400 may be used to control the turbocharger system described above with regard to FIGS. 2-3 or may be used to operate another suitable turbocharger system. Method 400 may be executed via instructions stored in non-transitory memory of a controller as shown in FIGS. 1 and 2.

At 402, the method 400 includes flowing exhaust gas from a first cylinder to a first exhaust manifold and at 404 the method includes flowing exhaust gas from a second cylinder to a second exhaust manifold.

During a first operating condition steps 406, 408, and 410 may be implemented. The first operating condition may be when one of the first and second turbines has exceeded a predetermined threshold speed and the second operating condition may be when both the first and the second turbines are below a predetermined threshold speed. It will be appreciated that the pressure in the exhaust manifold upstream of the turbines may be correlated to the speed of the turbine. The first operating conduit may additionally or alternatively be when the boost pressure provided to the engine via the turbocharger system has surpassed a predetermined value. The first operating condition may additionally or alternatively be when the engine is below a predetermined temperature and the second operating condition may additional or alternatively be when the engine is above the predetermined temperature.

At 406, the method includes flowing exhaust gas from the first and second exhaust manifolds to a shared bypass conduit in fluidic communication with an inlet of a first turbine and an inlet of a second turbine and an outlet of the first turbine and an outlet of the second turbine. At 408, the method includes flowing exhaust gas through the shared bypass conduit via operation of a wastegate coupled to the shared bypass conduit. In some examples, flowing exhaust gas through the shared bypass conduit includes flowing exhaust gas through a catalytic converter positioned in the shared bypass conduit downstream of the wastegate and where the first operating condition is when an engine including the turbocharger system is below a predetermined temperature. In such an example, the method 400 may further include, during the first operating condition, flowing exhaust gas from the first catalytic converter to a second catalytic converter positioned downstream of the first catalytic converter. At 410, the method includes flowing exhaust gas from the shared bypass conduit to at least one emission control device positioned downstream of at least one of the first turbine and the second turbine. It will be appreciated that steps 406, 408, and 410 adjust a first turbine speed and a second turbine speed via a sole actuator positioned in an exhaust passage of an engine.

During a second operating condition steps 412, 414, 416, 418, 420, and 422 may be implemented. The second operating condition may be when both the first and the second turbines are below a predetermined threshold speed and/or a when the boost pressure provided to the engine via the turbocharger system is less than a predetermined value. The second operating conduit may additionally or alternatively be when the boost pressure provided to the engine via the turbocharger system is below a predetermined value. The second operating condition may additionally or alternatively be when the engine is above a predetermined temperature.

At 412, the method includes inhibiting exhaust gas flow through the shared bypass conduit via operation of the wastegate. At 414, the method includes flowing exhaust gas from the first exhaust manifold to the first turbine. At 416, the method includes flowing exhaust gas from the second exhaust manifold to the second turbine. At 418, the method includes flowing exhaust gas through the first turbine. At 420, the method includes flowing exhaust gas through the second turbine and at 422 the method includes flowing exhaust gas from the first and second turbines to at least one emission control device positioned downstream of at least one of the first turbine and the second turbine.

In this way, the method of FIG. 4 adjusts speed of first and second turbines via a sole actuator positioned in an exhaust passage of an engine. The sole actuator may be a wastegate. Further, the wastegate may be vacuum or electrically operated. Further, a single and sole wastegate is adjusted in response to conditions of two separate turbochargers. For example, the wastegate is opened and/or closed responsive to pressures in two different exhaust manifolds. Further, the two exhaust manifolds may be fluidly isolated from each other on the exhaust side of engine cylinders when the wastegate is closed. Thus, the sole wastegate may be adjusted responsive to conditions in two cylinder exhaust banks.

FIG. 5 shows a method 500 for operation of a turbocharger system. The method 500 may be used to control the turbocharger system described above with regard to FIGS. 2-3 or may be used to operate another suitable turbocharger system. Method 500 may be executed via instructions stored in non-transitory memory of a controller as shown in FIGS. 1 and 2.

At 502, the method includes flowing exhaust gas from a first cylinder to a first exhaust manifold. At 504, the method includes flowing exhaust gas from a second cylinder to a second exhaust manifold.

At 506, it is determined if the intake manifold pressure is greater than a predetermined value. In other examples, it may be determined if the pressure in at least one of a first and second exhaust manifolds is greater than a predetermined value. Still further in some examples, it may be determined if the speed of at least one of a first turbine and a second turbine is greater than a predetermined value. If the intake manifold air pressure is not greater than a predetermined value (NO at 506), the method includes at 508 inhibiting exhaust gas flow through the shared bypass conduit via operation of a sole wastegate coupled to the shared bypass conduit. However, if the intake manifold air pressure is greater than a predetermined value (YES at 506), the method includes at 510 flowing exhaust gas from the first and second exhaust manifolds to a shared bypass conduit in fluidic communication with an inlet of a first turbine and an inlet of a second turbine and an outlet of the first turbine and an outlet of the second turbine. At, 512 flowing exhaust gas through the shared bypass conduit via operation of the wastegate.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A turbocharger system, comprising:
  a first turbocharger including a first turbine in fluidic communication with a first cylinder;
  a second turbocharger including a second turbine in fluidic communication with a second cylinder;
  a shared bypass conduit having a sole wastegate coupled thereto, the shared bypass conduit in fluidic communication with a first turbine inlet and a second turbine inlet, the sole wastegate including a first flow adjustment mechanism adjusting a flowrate of exhaust gas from a first wastegate inlet and a second flow adjustment mechanism adjusting a flowrate of exhaust gas from a second wastegate inlet; and
  a controller including executable instructions stored in non-transitory memory to, during a first operating condition, flow exhaust through the shared bypass conduit in fluidic communication with the first turbine inlet, the second turbine inlet, a first turbine outlet, and a second turbine outlet via operation of a sole actuator, where the sole actuator is a wastegate, and where the wastegate is coupled to the shared bypass conduit and during a second operating condition, inhibiting exhaust flow through the shared bypass conduit via operation of the wastegate, where the first operating condition is when one of the first and second turbines has exceeded a predetermined threshold speed and the second operating condition is when both the first and the second turbines are below the predetermined threshold speed.

2. The turbocharger system of claim 1, where the first turbine outlet and the second turbine outlet are in fluidic communication with an exhaust conduit that fluidly converges into a single exhaust conduit downstream of the first and second turbine outlets.

3. The turbocharger system of claim 1, where the sole wastegate includes the first wastegate inlet in fluidic communication with the first cylinder and the second wastegate inlet in fluidic communication with the second cylinder.

4. The turbocharger system of claim 1, where the sole wastegate is positioned downstream of a confluence region of a first branch passage in fluidic communication with the first cylinder and a second branch passage in fluidic communication with the second cylinder, the first and second branch passages included in the shared bypass conduit, and a single wastegate inlet is in fluidic communication with the first and second cylinders.

5. The turbocharger system of claim 4, where the first branch passage includes an inlet opening into a first exhaust manifold that is in fluidic communication with the first cylinder and where the second branch passage includes an inlet opening into a second exhaust manifold that is in fluidic communication with the second cylinder.

6. The turbocharger system of claim 1, further comprising an emission control device positioned in the shared bypass conduit downstream of the sole wastegate.

7. The turbocharger system of claim 1, where the first turbine is in fluidic communication with a plurality of cylinders in a first cylinder bank and where the second turbine is in fluidic communication with a plurality of cylinders in a second cylinder bank.

8. The turbocharger system of claim 1, where the first turbine and the second turbine are substantially identical.

9. The turbocharger system of claim 1, where the sole wastegate is positioned in a confluence region of a first branch passage in fluidic communication with the first cylinder and a second branch passage in fluidic communication with the second cylinder, the first and second branch passages included in the shared bypass conduit.

10. A method for operation of a turbocharger system, comprising:
  adjusting a first turbine speed and a second turbine speed via a sole actuator positioned in an exhaust passage of an engine;
  during a first operating condition, flowing exhaust through a shared bypass conduit in fluidic communication with a first turbine inlet, a second turbine inlet, a first turbine outlet, and a second turbine outlet via operation of the sole actuator, where the sole actuator is a wastegate, and where the wastegate is coupled to the shared bypass conduit; and
  during a second operating condition, inhibiting exhaust flow through the shared bypass conduit via operation of the wastegate, where the first operating condition is when one of the first and second turbines has exceeded a predetermined threshold speed and the second operating condition is when both the first and the second turbines are below the predetermined threshold speed.

11. The method of claim 10, further comprising flowing exhaust from a first cylinder bank to the first turbine and flowing exhaust from a second cylinder bank to the second turbine during the second operating condition.

12. The method of claim 10, where the first turbine inlet is in fluidic communication with a first cylinder bank and the second turbine inlet is in fluidic communication with a second cylinder bank, each of the first and second cylinder banks including at least one cylinder.

13. The method of claim 10, further comprising flowing exhaust gas from a first cylinder bank and a second cylinder bank to the shared bypass conduit during the first operating condition.

14. The method of claim 10, where flowing exhaust through the shared bypass conduit includes flowing exhaust through a catalytic converter positioned in the shared bypass conduit downstream of the wastegate and where the first operating condition is when the engine including the turbocharger system is below a predetermined temperature.

15. A turbocharger system, comprising:
  a first turbocharger including a first turbine in fluidic communication with a first cylinder bank including at least one cylinder;
  a second turbocharger including a second turbine in fluidic communication with a second cylinder bank including at least one cylinder;

a shared bypass conduit having a sole wastegate coupled thereto, the shared bypass conduit in fluidic communication with an inlet of the first turbine and an inlet of the second turbine; and a control system including instructions stored in non-transitory memory for adjusting the wastegate to flow exhaust gas through the shared bypass conduit during a first operating condition and adjusting the wastegate to substantially inhibit exhaust gas from flowing through the shared bypass conduit during a second operating condition, where the first operating condition is when exhaust gas exiting one of the first and second cylinder banks exceeds a predetermined flowrate threshold value and the second operating condition is when exhaust gas exiting each of the first and second cylinder banks is below the predetermined flowrate threshold value.

* * * * *